(12) United States Patent
Seo et al.

(10) Patent No.: US 9,863,714 B2
(45) Date of Patent: Jan. 9, 2018

(54) HEAT EXCHANGER AND CORRUGATED FIN THEREOF

(71) Applicant: SAMSUNG ELECTRONICS CO., LTD., Suwon-si, Gyeonggi-do (KR)

(72) Inventors: Kang Tae Seo, Suwon-si (KR); Yong Ki Baek, Cheonan-si (KR); Gaku Hayase, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 600 days.

(21) Appl. No.: 14/341,086

(22) Filed: Jul. 25, 2014

(65) Prior Publication Data
US 2015/0034289 A1    Feb. 5, 2015

(30) Foreign Application Priority Data
Jul. 30, 2013 (KR) ........................ 10-2013-0090528

(51) Int. Cl.
*F28F 1/12* (2006.01)
*F28D 7/16* (2006.01)
(Continued)

(52) U.S. Cl.
CPC ................ *F28F 1/12* (2013.01); *B23P 15/26* (2013.01); *F28D 7/16* (2013.01); *F28F 1/128* (2013.01);
(Continued)

(58) Field of Classification Search
CPC .... F28F 1/126; F28F 1/128; F28F 1/14; F28F 17/005; F28F 1/12; F28F 2215/08;
(Continued)

(56) References Cited

U.S. PATENT DOCUMENTS 3,298,432 A * 1/1967 Stanislaus Przyborowski ....... F28D 1/0391 165/153
7,428,920 B2 * 9/2008 Antonijevic ............ F28F 1/128 165/152
(Continued)

FOREIGN PATENT DOCUMENTS

CN    101619950    1/2010
CN    101672554    3/2010
(Continued)

OTHER PUBLICATIONS

European Search Report dated Jan. 27, 2015 in corresponding European Patent Application No. 14178977.6.
(Continued)

*Primary Examiner* — Tho V Duong
(74) *Attorney, Agent, or Firm* — Staas & Halsey LLP

(57) ABSTRACT

A heat exchanger including a plurality of horizontally arranged tubes, headers to support the tubes and to enable a refrigerant to flow in the tubes, and a corrugated fin horizontally disposed between the tubes, wherein the corrugated fins includes a vertical fin body, flat contact parts formed at an upper part and a lower part of the fin body, the flat contact parts being in surface contact with a top and a bottom of the tubes, and curved contact parts extending from opposite ends of the flat contact parts, the curved contact parts being in surface contact with the sides of the tubes, the fin body includes drainage guides formed outside the flat contact parts in a lateral direction, and each drainage guide includes protruding parts protruding more upward and downward than the flat contact parts.

13 Claims, 22 Drawing Sheets

(51) Int. Cl.
    *B23P 15/26*    (2006.01)
    *F28F 17/00*    (2006.01)
    *F28D 1/053*    (2006.01)

(52) U.S. Cl.
    CPC ........ *F28F 17/005* (2013.01); *F28D 1/05391* (2013.01); *F28F 2215/08* (2013.01); *F28F 2265/22* (2013.01); *Y10T 29/4935* (2015.01)

(58) Field of Classification Search
    CPC .... F28F 2265/22; F28D 1/05391; F28D 7/16; B23P 15/26; Y10T 29/4935
    See application file for complete search history.

(56) References Cited

U.S. PATENT DOCUMENTS

| | | | |
|---|---|---|---|
| 2001/0035284 A1* | 11/2001 | Iwasaki | F28D 1/0435 165/135 |
| 2007/0151716 A1 | 7/2007 | Lee et al. | |
| 2011/0036550 A1 | 2/2011 | Jiang et al. | |
| 2011/0139428 A1 | 6/2011 | Kim et al. | |
| 2012/0273182 A1 | 11/2012 | Kondo et al. | |

FOREIGN PATENT DOCUMENTS

| | | | | |
|---|---|---|---|---|
| CN | 102047064 | | 5/2011 | |
| JP | 1-181092 | | 7/1989 | |
| JP | 01181092 A | * | 7/1989 | .............. F28F 1/126 |
| JP | 7-55380 | | 3/1995 | |
| JP | 07055380 A | * | 3/1995 | .............. F28F 1/128 |
| JP | 2008-101847 | | 5/2008 | |
| JP | 2008101847 A | * | 5/2008 | ............ F28F 17/005 |
| JP | 2010-255974 | | 11/2010 | |
| JP | 2013-139996 | | 7/2013 | |
| WO | 2006/004137 | | 1/2006 | |
| WO | WO 2012/027098 | | 3/2012 | |
| WO | WO 2012/098914 | | 7/2012 | |
| WO | WO 2013/089116 | | 6/2013 | |

OTHER PUBLICATIONS

International Search Report dated Nov. 7, 2014 in corresponding International Application No. PCT/KR2014/006990.

Chinese Office Action dated Sep. 4, 2017 in Chinese Patent Application No. 201410366630.0.

\* cited by examiner

HEAT EXCHANGER AND CORRUGATED FIN THEREOF

CROSS-REFERENCE TO RELATED APPLICATIONS

This application claims the benefit of Korean Patent Application No. 10-2013-0090528, filed on Jul. 30, 2013 in the Korean Intellectual Property Office, the disclosure of which is incorporated herein by reference.

BACKGROUND

1. Field

Embodiments of the present disclosure relate to a parallel flow heat exchanger having a corrugated fin.

2. Description of the Related Art

Generally, a heat exchanger is an apparatus, including tubes, in which a refrigerant flows, to exchange heat with external air and a heat exchange fin disposed in contact with the tubes to increase a heat dissipation area, which performs heat exchange between the refrigerant and the external air.

Heat exchangers may be classified into a fin tube type heat exchanger configured such that a copper heat transfer pipe extends through a thin heat exchange fin made of aluminum and a parallel flow type heat exchanger configured such that a heat exchange fin is disposed between tubes, each having a plurality of micro channels, made of aluminum and the tubes are supported by a pair of headers. The parallel flow type heat exchanger is relatively inexpensive while exhibiting high efficiency.

In such a parallel flow type heat exchanger, a corrugated fin corrugated in a wave form may be used.

In a case in which a parallel flow type heat exchanger having vertical headers and a corrugated fin is used as an evaporator, however, condensed water may not be sufficiently drained and frost may be quickly formed. For this reason, the parallel flow type heat exchanger is mainly used as a condenser.

SUMMARY

It is an aspect of the present disclosure to provide a corrugated fin applicable to a parallel flow type heat exchanger having vertical headers, wherein drainage performance is excellent and formation of frost is delayed, and a heat exchanger including the same.

Additional aspects of the disclosure will be set forth in part in the description which follows and, in part, will be apparent from the description, or may be learned by practice of the disclosure.

In accordance with an aspect of the present disclosure, a heat exchanger includes tubes horizontally arranged so as to be vertically spaced from each other by a predetermined distance, each tube having a flat top, a flat bottom, and round sides, headers vertically disposed at opposite ends of the tubes such that the headers communicate with the tubes, and a corrugated fin disposed between the tubes in contact, wherein the corrugated fins include a vertical fin body, flat contact parts formed at an upper part and a lower part of the fin body, the flat contact parts being in surface contact with a top and a bottom of the tubes, and curved contact parts extending from opposite ends of the flat contact parts, the curved contact parts being in surface contact with the sides of the tubes, the fin body includes drainage guides formed outside the flat contact parts in a lateral direction, and each drainage guide includes protruding parts protruding more upward and downward than the flat contact parts.

Each flat contact part may have the same width as the top or the bottom of each tube.

Each curved contact part may have the same curvature as the sides of each tube.

Each protruding part may have a height equal to or less than half a height of each tube.

Each protruding part may have a height of 0.65 to 1.5 mm.

Each drainage guide may have a width of 3 to 5 mm.

The corrugated fin may further include a louver unit having a plurality of successively formed louvers and at least a portion of the louver unit may be formed at each drainage guide.

The corrugated fin may include a first corrugated fin disposed above any one of the tubes and a second corrugated fin disposed below the tube and the first corrugated fin and the second corrugated fin may be disposed such that a lower protruding part of the first corrugated fin and an upper protruding part of the second corrugated fin contact each other.

The tubes may be arranged in two rows including a front row and a rear row, the flat contact parts may be arranged in two rows including a front row and a rear row, the curved contact parts may be arranged in two rows including a front row and a rear row, and the drainage guides may include outside drainage guides formed at a front outside of the front-row flat contact part and a rear outside of the rear-row flat contact part and an inside drainage guide formed between the front-row flat contact part and the rear-row flat contact part.

The protruding parts may be formed by cutting a top and a bottom of an intermediate molding for the corrugated fin having a square wave form along a predetermined cutting line and bending predetermined portions.

The curved contact parts may be formed by cutting a top and a bottom of an intermediate molding for the corrugated fin having a square wave form along a predetermined cutting line and bending predetermined portions.

The fin body may include a first fin body and a second fin body extending from a front end and a rear end of each flat contact part and the corrugated fin may further include a connection part connected between the first fin body and the second fin body.

Each flat contact part may include a first part, a second part, and an opening defined between the first part and the second part.

The first part and the second part may each include a bent part bent perpendicularly from one end thereof on the opening side.

In accordance with another aspect of the present disclosure, a heat exchanger includes tubes horizontally arranged so as to be vertically spaced from each other by a predetermined distance, each tube having a flat top, a flat bottom, and round sides, headers vertically disposed at opposite ends of the tubes such that the headers communicate with the tubes, and a corrugated fin disposed between the tubes in contact, wherein the corrugated fins includes a vertical fin body and flat contact parts formed at an upper part and a lower part of the fin body, the flat contact parts being in surface contact with a top and a bottom of the tubes, the fin body includes drainage guides formed outside the flat contact parts in a lateral direction, and each drainage guide includes protruding parts protruding more upward and downward than the flat contact parts.

The fin body may include a first fin body and a second fin body extending from a front end and a rear end of each flat contact part and the corrugated fin may further include a connection part connected between the first fin body and the second fin body.

Each flat contact part may include a first part, a second part, and an opening defined between the first part and the second part.

The first part and the second part may each include a bent part bent perpendicularly from one end thereof on the opening side.

In accordance with another aspect of the present disclosure, a heat exchanger includes tubes horizontally arranged so as to be vertically spaced from each other by a predetermined distance, each tube having a flat top, a flat bottom, and round sides, headers vertically disposed at opposite ends of the tubes such that the headers communicate with the tubes, and a corrugated fin disposed between the tubes in contact, wherein the corrugated fins includes a first fin body and a second fin body disposed vertically such that the first fin body and the second fin body are parallel to each other and flat contact parts each including a first bent part bent from the first fin body toward the second fin body and a second bent part bent from the second fin body toward the first fin body, the first bent part and the second bent part overlapping each other, the flat contact parts being in surface contact with a top and a bottom of the tubes, each fin body includes drainage guides formed outside the flat contact parts in a lateral direction, and each drainage guide includes protruding parts protruding more upward and downward than the flat contact parts.

In accordance with another aspect of the present disclosure, a corrugated fin of a heat exchanger having tubes horizontally arranged so as to be vertically spaced from each other by a predetermined distance, each tube having a flat top, a flat bottom, and round sides, includes a vertical fin body, flat contact parts formed at an upper part and a lower part of the fin body, the flat contact parts being in surface contact with a top and a bottom of the tubes, and curved contact parts extending from opposite ends of the flat contact parts, the curved contact parts being in surface contact with the sides of the tubes, wherein the fin body includes drainage guides formed outside the flat contact parts in a lateral direction and each drainage guide includes protruding parts protruding more upward and downward than the flat contact parts.

In accordance with a further aspect of the present disclosure, a manufacturing method of a corrugated fin of a heat exchanger having tubes horizontally arranged so as to be vertically spaced from each other by a predetermined distance, each tube having a flat top, a flat bottom, and round sides, includes preparing an intermediate molding for the corrugated fin having a square wave form, forming flat contact parts configured to be in surface contact with a top and a bottom of the tubes, forming curved contact parts configured to be in surface contact with the sides of the tubes at opposite ends of the flat contact parts, and forming protruding parts protruding more upward and downward than the flat contact parts outside the flat contact parts in a lateral direction.

The forming the protruding parts may include cutting a top and a bottom of the intermediate molding for the corrugated fin along a predetermined cutting line and bending predetermined portions of the cut intermediate molding.

The forming the curved contact parts may include cutting a top and a bottom of the intermediate molding for the corrugated fin along a predetermined cutting line and bending predetermined portions of the cut intermediate molding.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
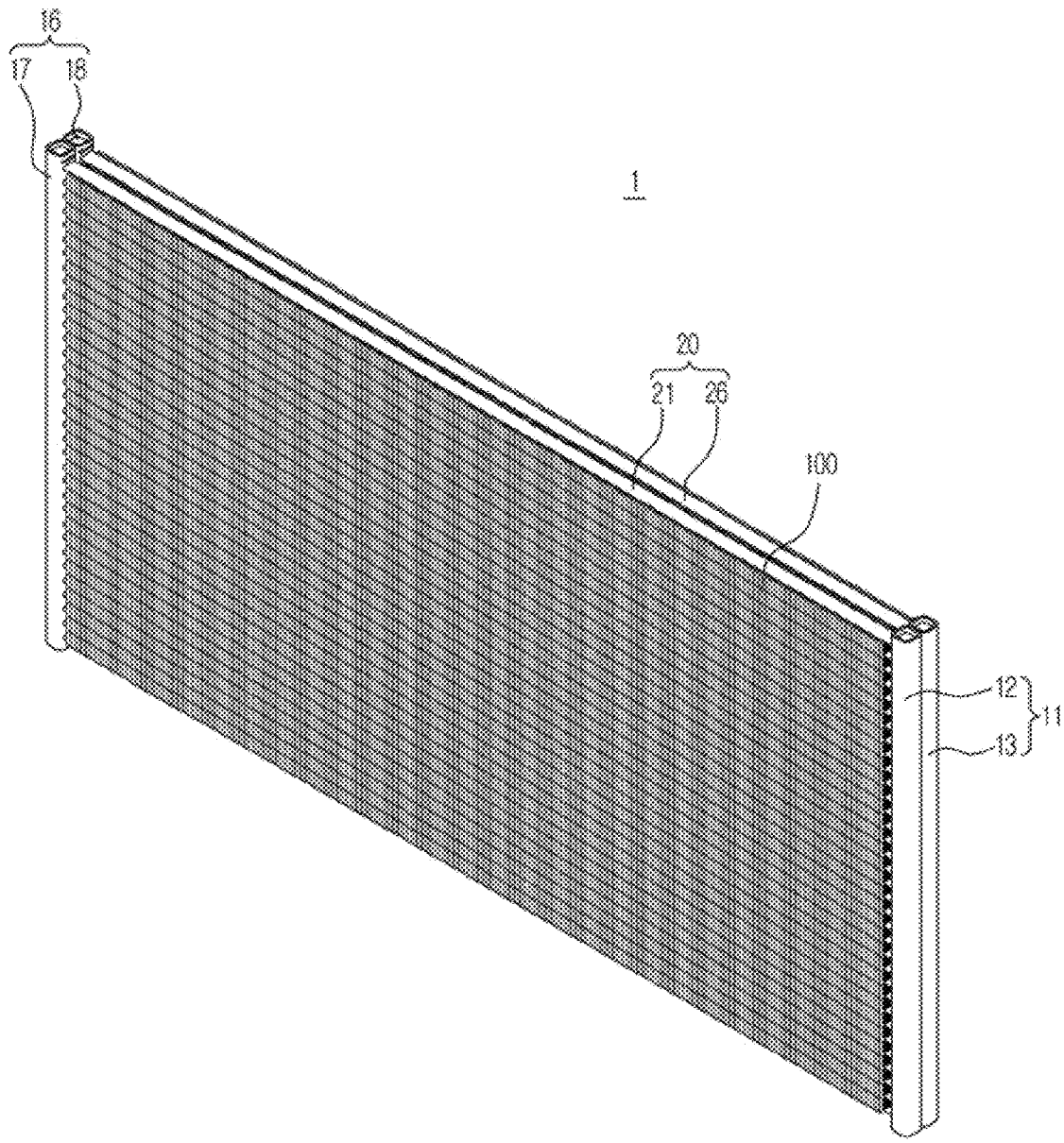
FIG. 1 is a view showing the external appearance of a heat exchanger according to an embodiment of the present disclosure.

Reference will now be made in detail to the embodiments of the present disclosure, examples of which are illustrated in the accompanying drawings, wherein like reference numerals refer to like elements throughout.

Figure 2:
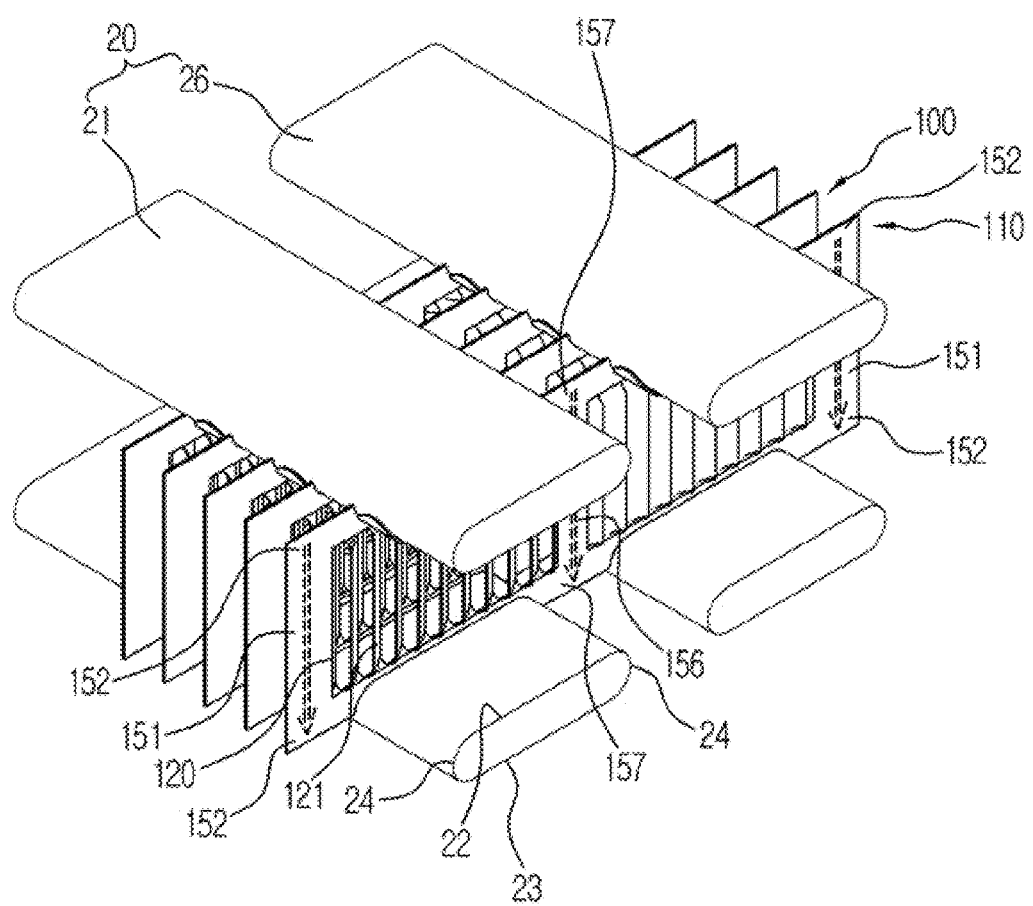
FIG. 2 is an enlarged view showing portions of a corrugated fin and a tube according to an embodiment of the present disclosure.
Figure 3:
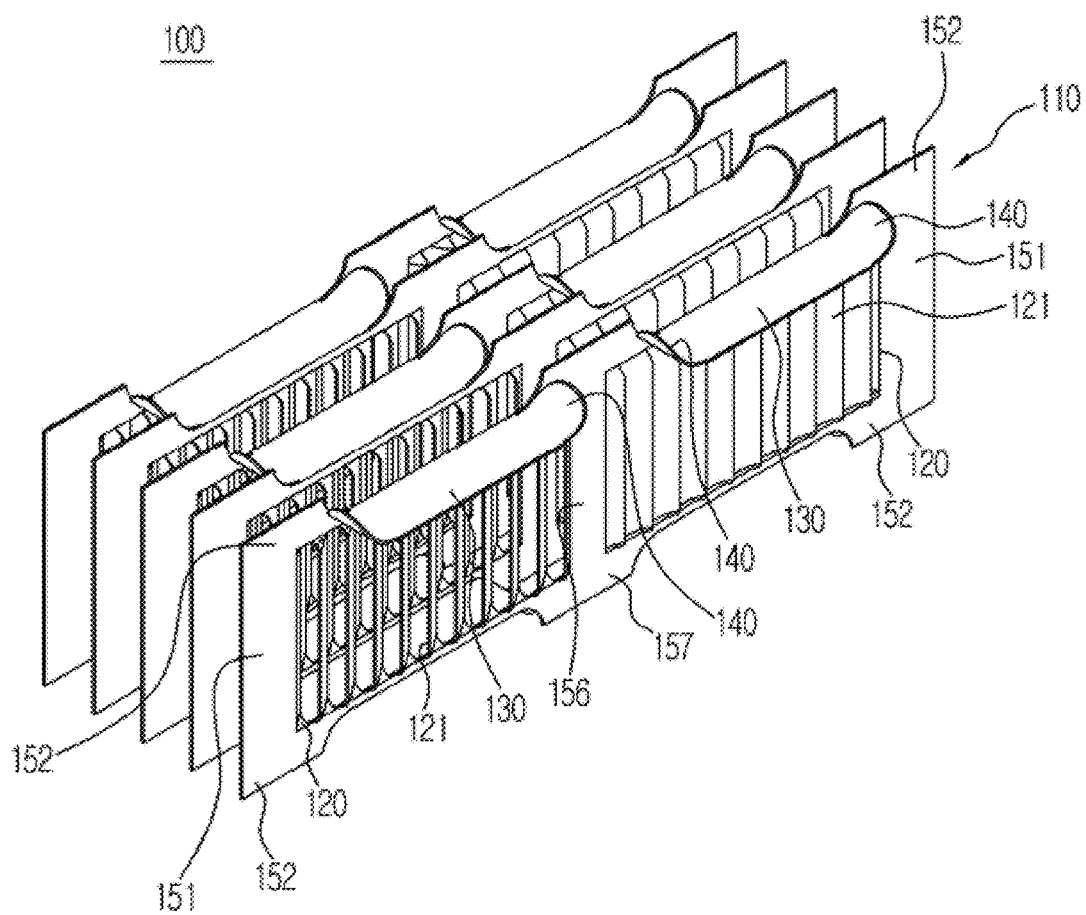
FIG. 3 is a perspective view showing a portion of the corrugated fin according to the embodiment of the present disclosure.
Figure 4:
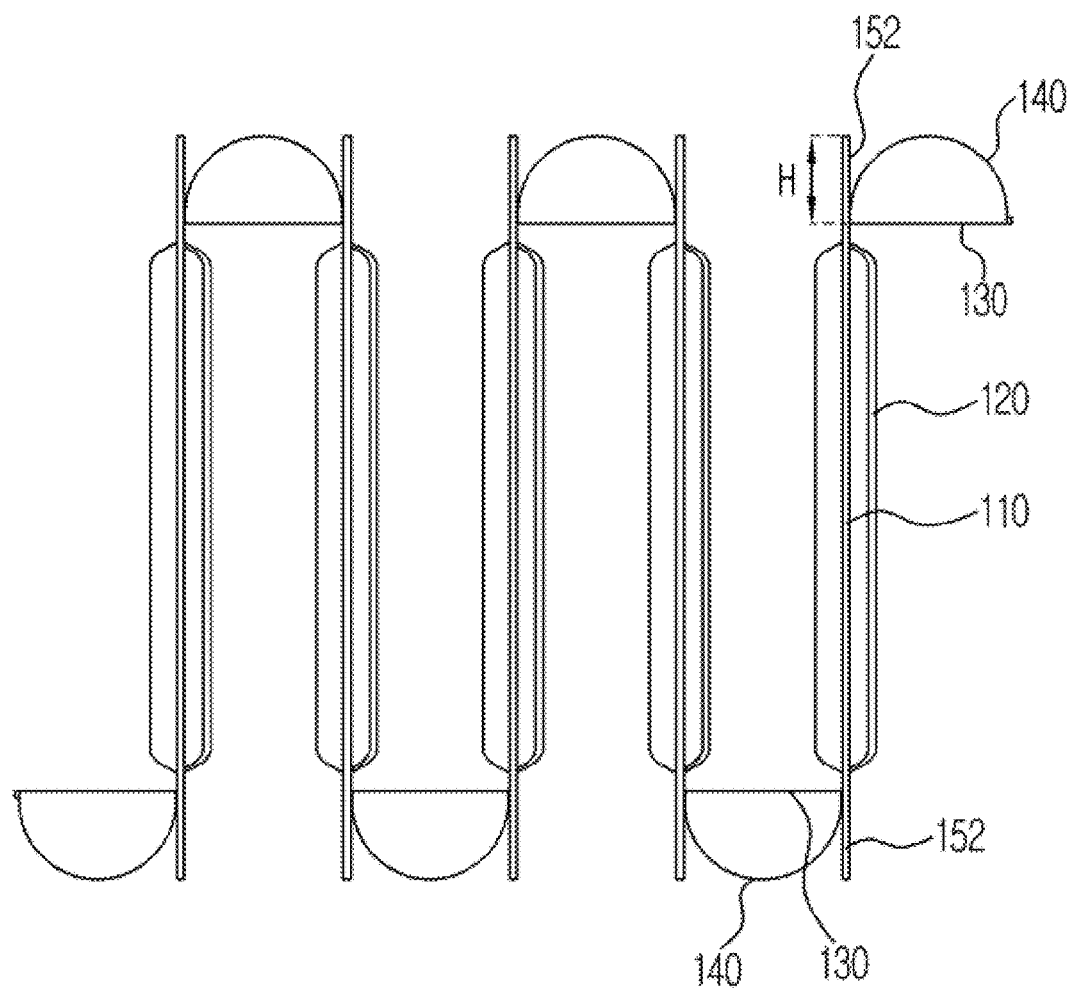
FIG. 4 is a front view showing a portion of the corrugated fin according to the embodiment of the present disclosure.
Figure 5:
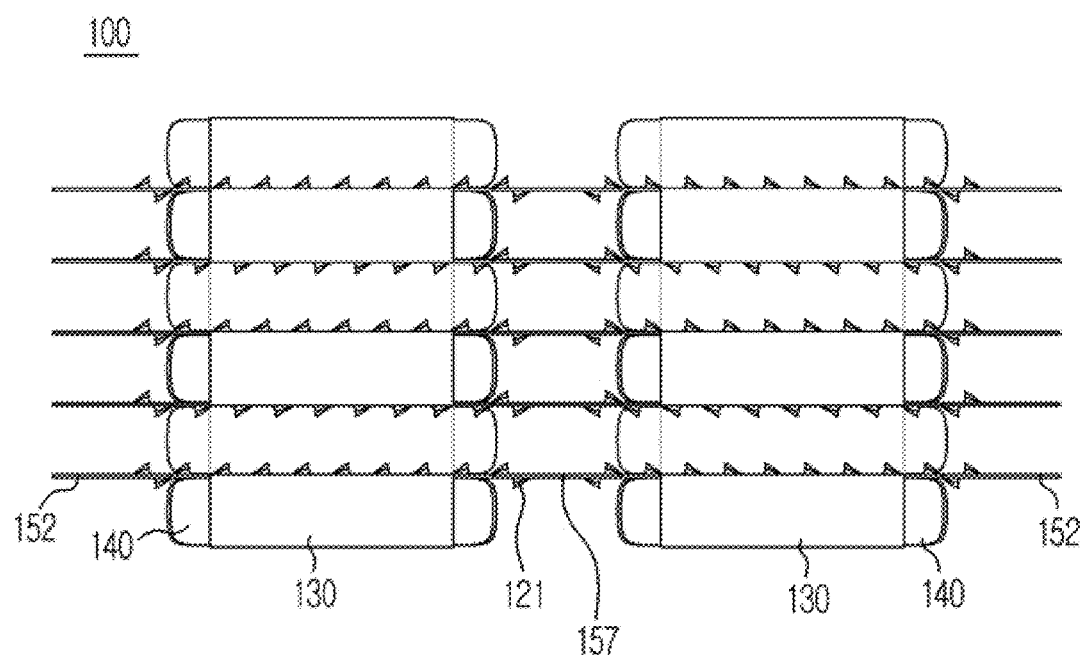
FIG. 5 is a top view showing a portion of the corrugated fin according to the embodiment of the present disclosure.
Figure 6:
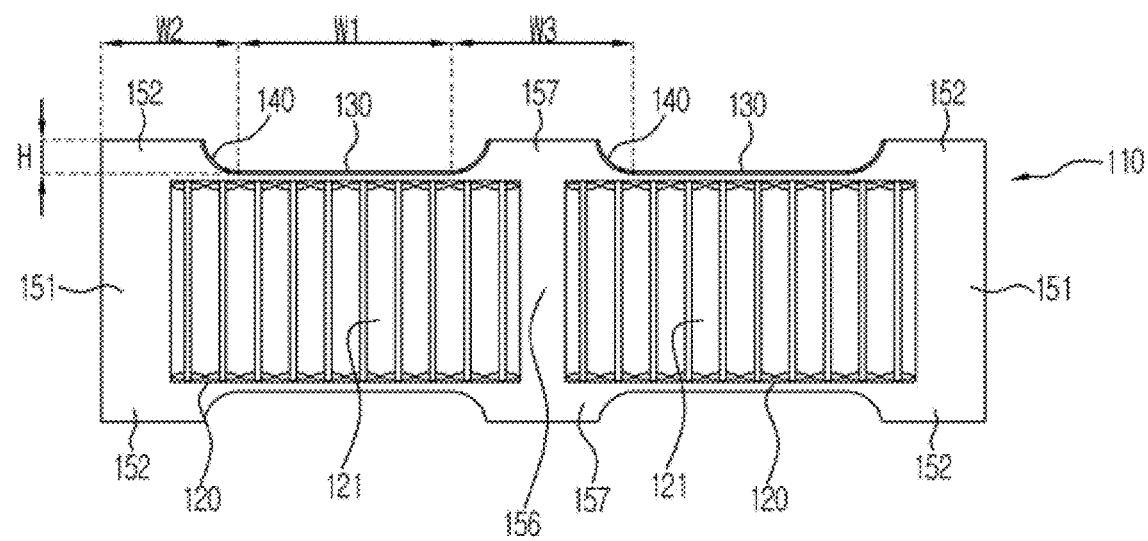
FIG. 6 is a side view showing a portion of the corrugated fin according to the embodiment of the present disclosure.
Figure 7:
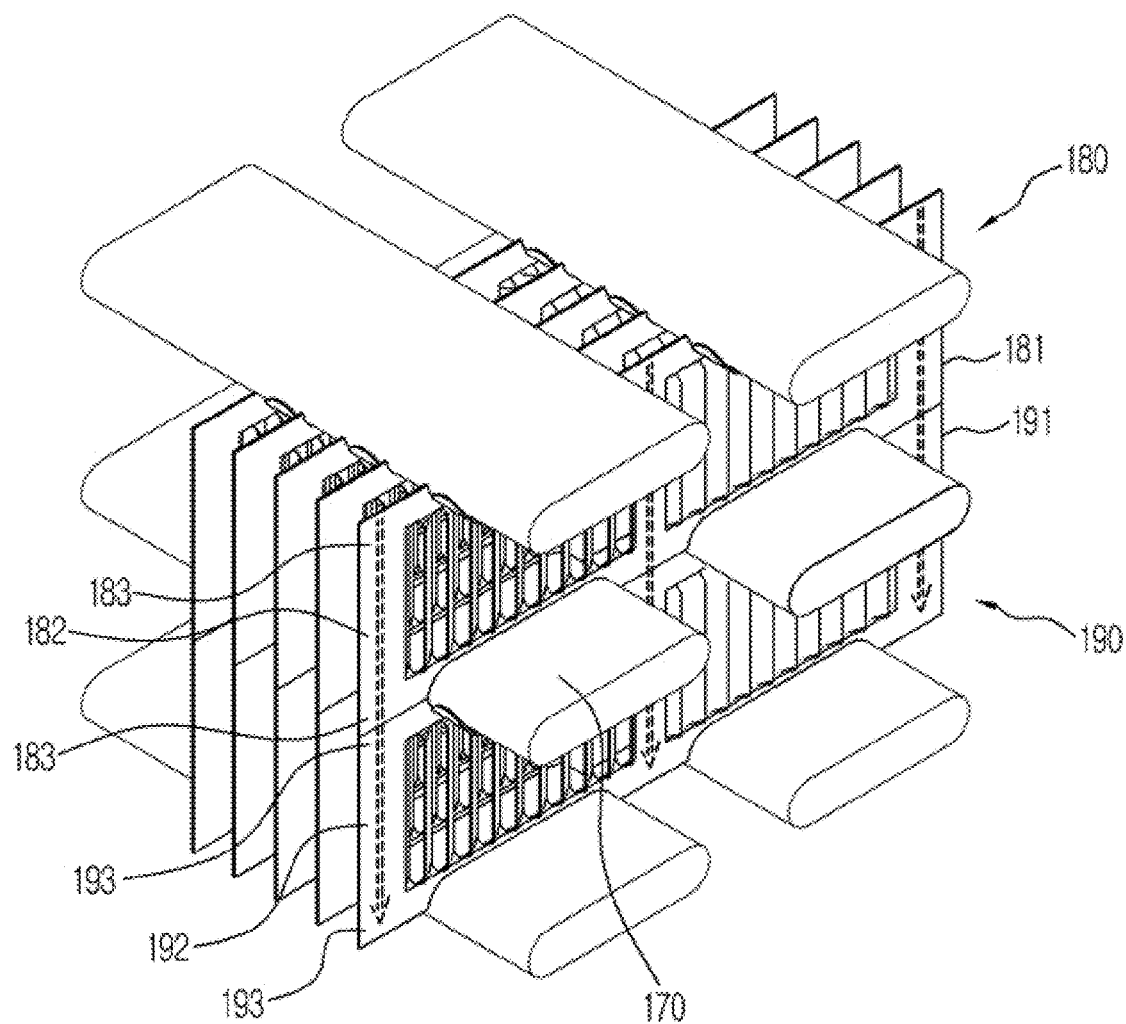
FIG. 7 is a view illustrating a structure in which a plurality of corrugated fins according to the embodiment of the present disclosure is disposed.

FIG. 1 is a view showing the external appearance of a heat exchanger according to an embodiment of the present disclosure. FIG. 2 is an enlarged view showing portions of a corrugated fin and a tube according to an embodiment of the present disclosure. FIG. 3 is a perspective view showing a portion of the corrugated fin according to the embodiment of the present disclosure, FIG. 4 is a front view showing a portion of the corrugated fin according to the embodiment of the present disclosure, FIG. 5 is a top view showing a portion of the corrugated fin according to the embodiment of the present disclosure, and FIG. 6 is a side view showing a portion of the corrugated fin according to the embodiment of the present disclosure. FIG. 7 is a view illustrating a structure in which a plurality of corrugated fins according to the embodiment of the present disclosure is disposed. In FIGS. 2 and 7, arrows indicate flow directions of condensed water.

Referring to FIGS. 1 to 6, a heat exchanger 1 includes tubes 20, in which a refrigerant flows, horizontally arranged so as to be vertically spaced from each other by a predetermined distance, headers 11 and 16 vertically provided at opposite ends of the tubes 20 to support the tubes 20 and to enable the refrigerant to flow in the tubes 20, and corrugated fins 100 disposed between the tubes 20 in contact, the corrugated fins 100 being corrugated in a wave form.

The tubes 20 are arranged in two rows, e.g. a front row and a rear row. Hereinafter, the tubes arranged in the front row will be referred to as front row tubes 21 and the tubes arranged in the rear row will be referred to as rear row tubes 26 for the convenience of description. However, embodiments of the present disclosure are not limited to a heat exchanger having two-row tubes. Embodiments of the present disclosure may also be applied to a heat exchanger having one-row tubes or three-row tubes or more.

Each tube 20 may be formed of aluminum. Each tube 20 may have a plurality of micro channels, in which the refrigerant flows.

Each tube 20 may be flat. That is, as shown in FIG. 2, each tube 20 may have a flat top 22, a flat bottom 23, and round sides 24 connected between the top and the bottom.

The headers 11 and 16 may include a first header 11 communicating with one-side ends of the tubes 20 and a second header 16 communicating with the other-side ends of the tubes 20. The first header 11 may have a first tank 12 communicating with the front row tubes 21 and a second tank 13 communicating with the rear row tubes 26. The second header 16 may have a third tank 17 communicating with the front row tubes 21 and a fourth tank 18 communicating with the rear row tubes 26.

To the first header 11 and the second header 16 may be mounted at least one baffle (not shown) to form a refrigerant channel. The first header 11 and the second header 16 may be provided with an inlet pipe (not shown), through which the refrigerant is introduced, and an outlet pipe (not shown), through which the refrigerant is discharged. The headers 11 and 16 may be formed of aluminum. The headers 11 and 16 may be coupled to the tubes 20 by brazing.

Each corrugated fin 100 is corrugated in a wave form and extends between the vertically disposed tubes 20 in the longitudinal direction of the tubes 20. Each corrugated fin 100 may contact the front row tubes 21 and the rear row tubes 26.

The corrugated fin 100 may be formed of aluminum. The corrugated fin 100 may be coupled to the tubes 20 by brazing.

The corrugated fin 100 may have vertical fin bodies 110 and contact parts 130 and 140 provided at the upper and lower ends of the fin bodies 110 in contact with the tubes 20.

Consequently, the corrugated fin 100 has a structure in which one fin body 110, upper contact parts 130 and 140, another fin body 110, and lower contact parts 130 and 140 are repeatedly arranged.

Each fin body 110 may be provided with a louver unit 120 having louvers 121 successively formed in the lateral direction to improve heat transfer performance.

The contact parts 130 and 140 may include flat contact parts 130, with which the flat tops 22 or the flat bottoms 23 of the tubes 20 are in surface contact, and curved contact parts 140, extending from opposite ends of the flat contact parts 130, with which the round sides 24 of the tubes 20 are in surface contact.

Each flat contact part 130 may have a width W1 (see FIG. 6) equal to that of the top 22 or the bottom 23 of each tube 20.

The curved contact parts 140 may have the same curvature as the sides 24 of the tubes 20 such that the curved contact parts 140 tightly contact the tubes 20. If the curvature of the curved contact parts 140 is less than that of the sides 24 of the tubes 20, a gap may be formed between the curved contact parts 140 and the sides 24 of the tubes 20 and condensed water may be collected in the gap.

As the corrugated fin 100 is in surface contact with the tubes 20 to surround the tubes 20 as described above, contact area between the tubes 20 and the corrugated fin 100 is increased and contact area between the surfaces of the tubes 20 and external air is decreased.

Consequently, heat transfer between the tubes 20 and the corrugated fin 100 is accelerated. When the heat exchanger 1 functions as an evaporator of an outdoor unit, therefore, formation of frost on the surfaces of the tubes 20 may be prevented or delayed.

However, the curved contact parts 140 are not essential any may be omitted as needed, which will be described hereinafter.

The flat contact parts 130 and the curved contact parts 140 may be formed in two rows, e.g. a front row and a rear row, to correspond to the two-row tubes 21 and 26.

Meanwhile, each fin body 110 may be provided with drainage guides 151 and 156 to guide condensed water formed on the surfaces of the tubes 20 or the surface of the corrugated fin 100 when the heat exchanger 1 functions as an evaporator such that the condensed water easily falls in the direction of gravity.

In a heat exchanger having conventional corrugated fins and vertical headers, condensed water drainage channels are alternately formed at the corrugated fins and tubes. That is, the condensed water drainage channels are not continuous. As a result, the condensed water may not be easily drained. In this embodiment, each corrugated fin includes drainage guides 151 and 156 which are vertically continuously formed to guide drainage of the condensed water.

In addition, the drainage guides 151 and 156 increase a contact area between external air and the corrugated fin 100.

The drainage guides 151 and 156 constitute a portion of each fin body 110. The drainage guides 151 and 156 are vertically continuously provided at outsides of the flat contact parts 130 in the lateral direction.

The drainage guides 151 and 156 may include outside drainage guides 151 formed at the front outside of the front-row flat contact part 130 and the rear outside of the rear-row flat contact part 130 and an inside drainage guide 156 formed between the front-row flat contact part 130 and the rear-row flat contact part 130.

As shown in FIG. 6, a width W2 of each outside drainage guide 151 and a width W3 of inside drainage guide 156 may be 3 to 5 mm. In addition, at least a portion of the louver unit 120 may be formed at the drainage guides 151 and 156.

As the drainage guides 151 and 156 are vertically continuously formed at the outsides of the tubes 20 in the lateral direction as described above, condensed water may naturally flow without being interfered with by the tubes 20.

Meanwhile, the drainage guides 151 and 156 may include protruding parts 152 and 157 protruding upward and downward such that the protruding parts 152 and 157 are located more outward than the flat contact part 130 in the vertical direction. In a case in which the protruding parts 152 and 157 are provided, the contact area with external air is more widened and flow of condensed water is more smoothed than in a case in which the protruding parts 152 and 157 are not provided.

In addition, in a case in which a corrugated fin 180 disposed above a certain tube 170 and a corrugated fin 190 disposed below the tube 170 are disposed such that fin bodies 181 and 191 are arranged side by side in the vertical direction as shown in FIG. 7, a lower protruding part 183 of the upper corrugated fin 180 and an upper protruding part 193 of the lower corrugated fin 190 may contact each other.

In this case, condensed water on the upper corrugated fin 180 may continuously flow from a drainage guide 182 of the upper corrugated fin 180 to a drainage guide 192 of the lower corrugated fin 190.

However, embodiments of the present disclosure are not limited to the above structure in which the upper corrugated fin 180 and the lower corrugated fin 190 are disposed such that the fin bodies 181 and 191 are arranged side by side in the vertical direction.

As shown in FIG. 6, a height H of the protruding parts 152 and 157 may be equal to or less than half that of the tube 20. This is because, when a corrugated fin disposed above a certain tube and a corrugated fin disposed below the tube are disposed such that fin bodies are arranged side by side in the vertical direction as previously described, interference may occur if the height of the protruding parts is greater than half that of the tube 20.

In consideration of the height of a generally used tube, the height H of the protruding parts 152 and 157 may be about 0.65 to 1.5 mm.

Figure 8:
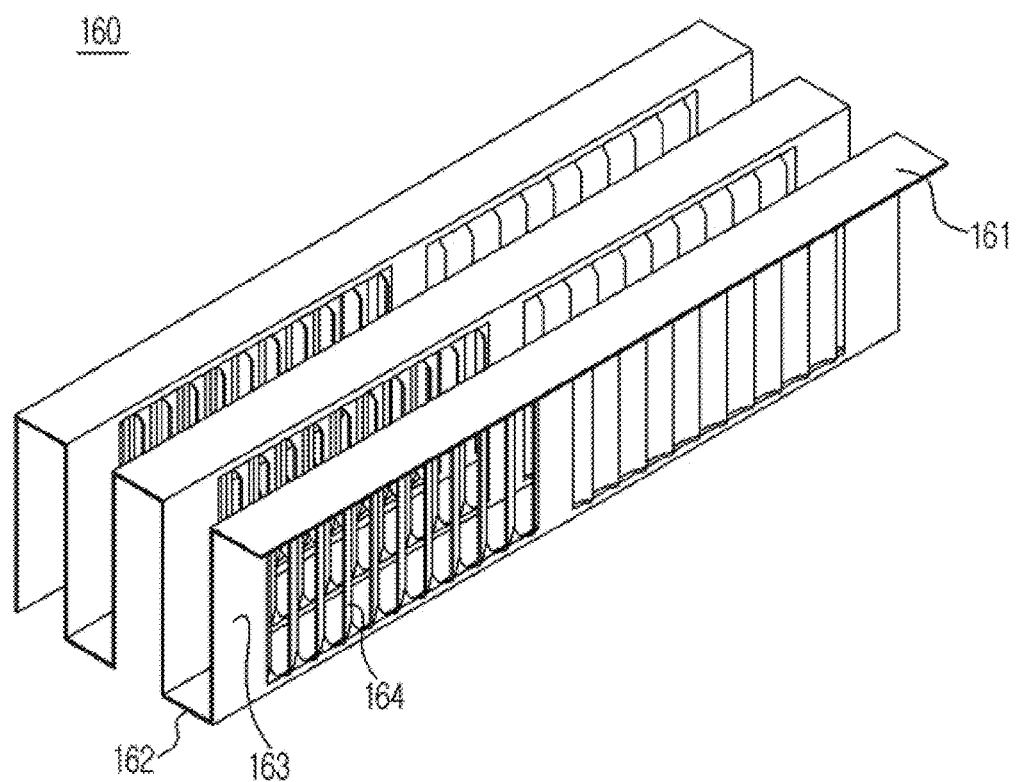
FIGS. 8 to 10 are views illustrating a manufacturing method of the corrugated fin according to the embodiment of the present disclosure.
Figure 9:
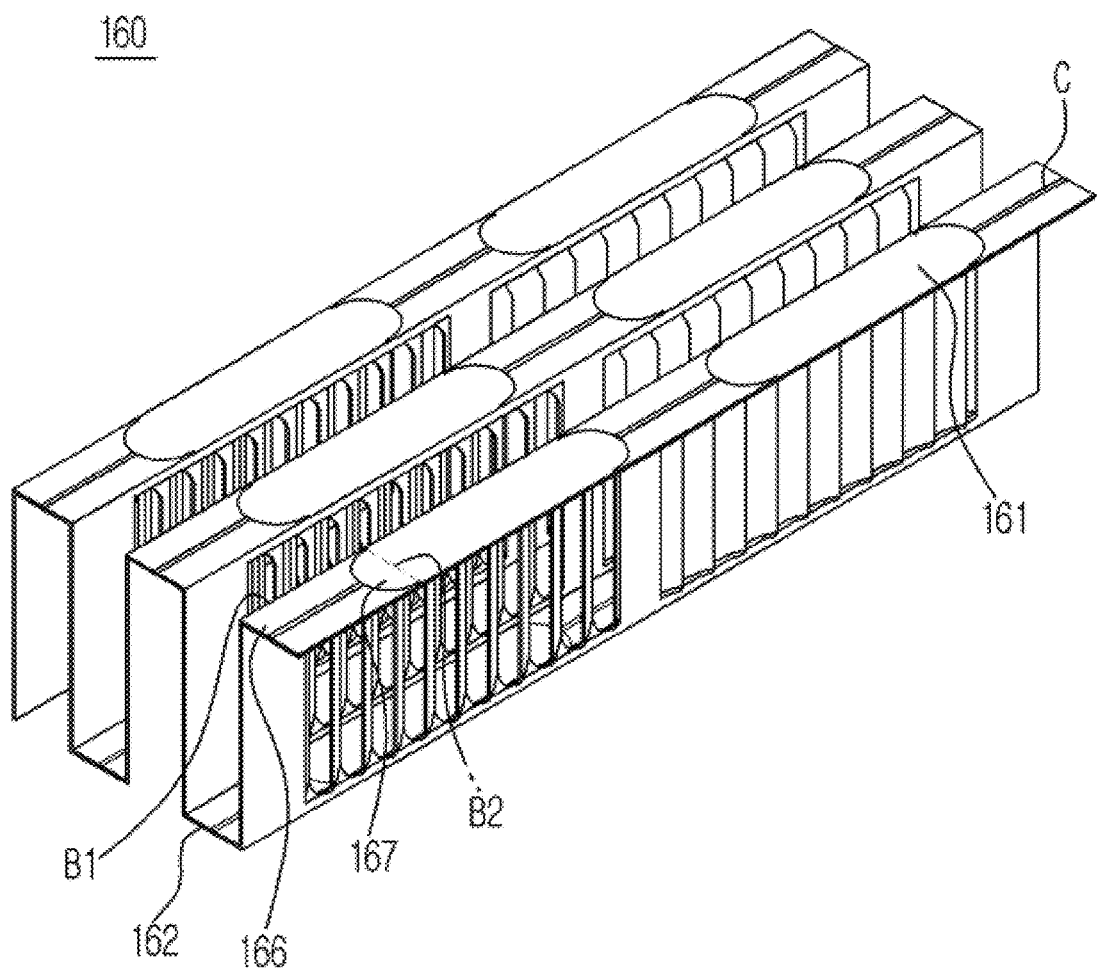
Figure 10:
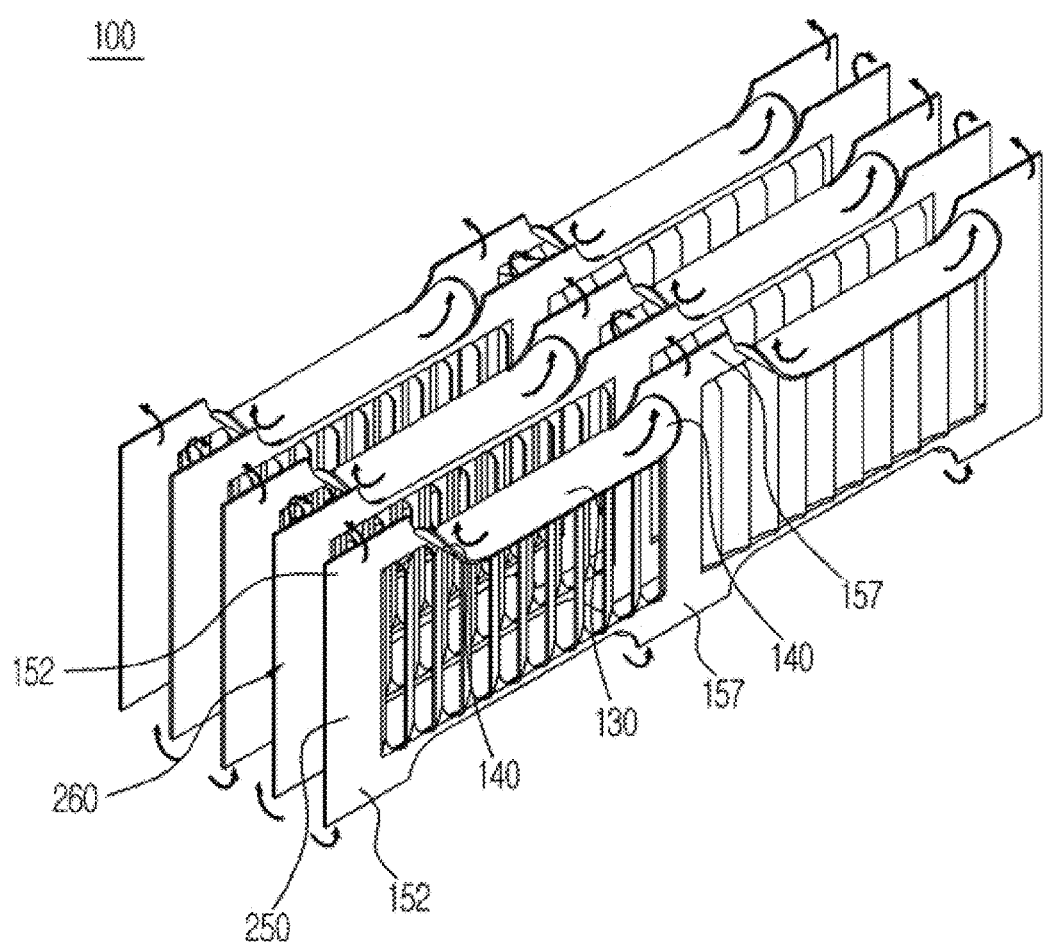

FIGS. 8 to 10 are views illustrating a manufacturing method of the corrugated fin according to the embodiment of the present disclosure. In FIG. 10, arrows indicate bending directions.

As shown in FIG. 8, in order to manufacture a corrugated fin, an intermediate molding 160 for the corrugated fin formed by bending an aluminum sheet into an approximate square wave form is prepared.

The intermediate molding 160 may have tops 161, vertical parts 163, and bottoms 162 alternately formed in the longitudinal direction. The width of the intermediate molding 160 may be greater than the sum of the widths of the front row tube and the rear row tube.

Louvers 164 are formed in each vertical part 163 of the intermediate molding 160. The louvers 164 may be formed later.

Subsequently, as shown in FIG. 9, the tops 161 and the bottoms 162 of the intermediate molding 160 are cut along a predetermined cutting line C.

Subsequently, predetermined portions 166 and 167 of the tops 161 and the bottoms 162 of the intermediate molding 160 are bent along bending lines B1 and B2.

As shown in FIG. 10, the predetermined portions 166 become protruding parts 152 of drainage guides after bending and the predetermined portions 167 become curved contact parts 140 after bending. The other unbent portions become flat contact parts 130. In order to adjust the height of the protruding parts 152, some of the tops 161 and the bottoms 162 of the intermediate molding 160 may be removed after cutting.

As described above, the curved contact parts 140 and the protruding parts 152 of the corrugated fin according to the embodiment of the present disclosure may be easily formed by cutting and bending.

Figure 11:
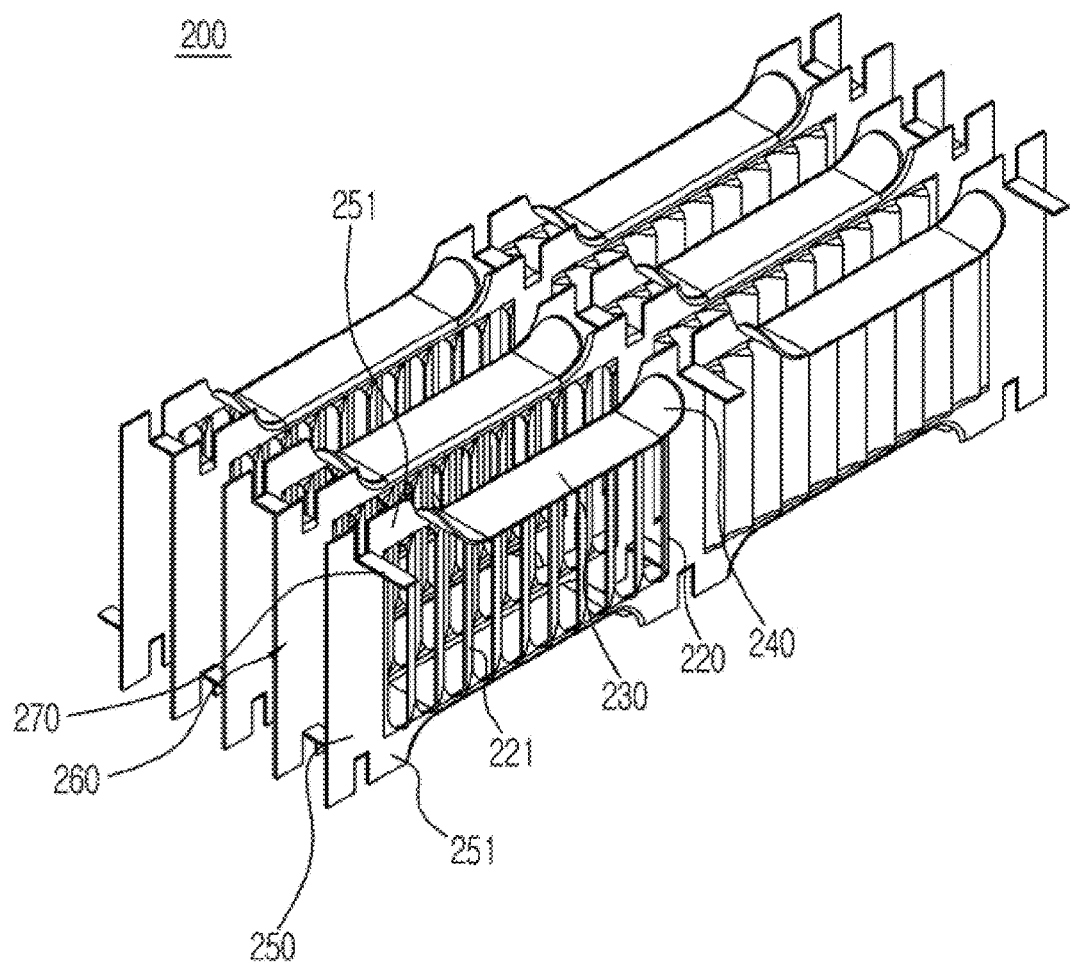
FIG. 11 is a perspective view showing a portion of a corrugated fin according to another embodiment of the present disclosure.
Figure 12:
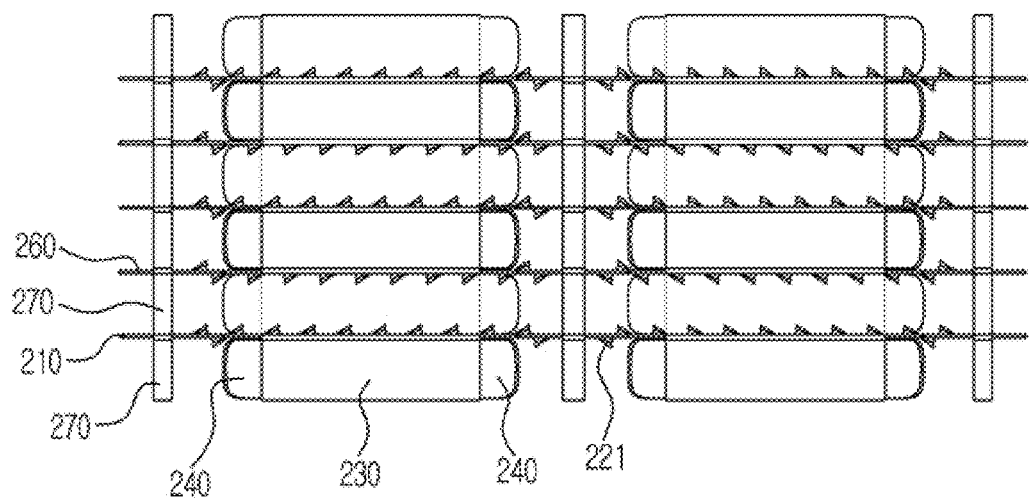
FIG. 12 is a top view showing a portion of the corrugated fin according to the embodiment of the present disclosure.

FIG. 11 is a perspective view showing a portion of a corrugated fin according to another embodiment of the present disclosure and FIG. 12 is a top view showing a portion of the corrugated fin according to the embodiment of the present disclosure.

A corrugated fin according to another embodiment of the present disclosure will be described with reference to FIGS. 11 and 12. The same components as the previous embodiment may be denoted by the same reference numerals and a description thereof may be omitted.

A corrugated fin 200 according to this embodiment includes vertical fin bodies 210 and contact parts 230 and 240 provided at the upper and lower ends of the fin bodies 210 in contact with tubes.

The contact parts 230 and 240 may include flat contact parts 230, with which flat tops or flat bottoms of the tubes are in surface contact, and curved contact parts 240, extending from opposite ends of the flat contact parts 230, with which round sides of the tubes are in surface contact.

Each fin body 110 may be provided with a louver unit 220 having louvers 221 successively formed in the lateral direction to improve heat transfer performance. In addition, each fin body 210 may be provided with drainage guides 250 formed at outsides of the flat contact part 230 in the lateral direction such that the condensed water easily falls in the direction of gravity. Each drainage guide 250 may include protruding parts 251 protruding upward and downward such that the protruding parts 251 are located more outward than the flat contact part 230.

Meanwhile, the corrugated fin 200 further includes first fin bodies 210, second fin bodies 260 adjacent to the respective first fin bodies 210 and horizontal connection parts 270 respectively connected between the first fin bodies 210 and the second fin bodies 260. That is, this embodiment is achieved by adding the connection parts 270 to the corrugated fin 100 according to the previous embodiment.

The connection parts 270 may be formed by not bending portions of an intermediate molding for the corrugated fin corresponding to the connection parts 270 during manufacture of the corrugated fin.

The connection parts 270 interconnect the first fin bodies 210 and the second fin bodies 260, thereby improving retention in shape, durability, and thermal conductivity of the corrugated fin 200.

Figure 13:
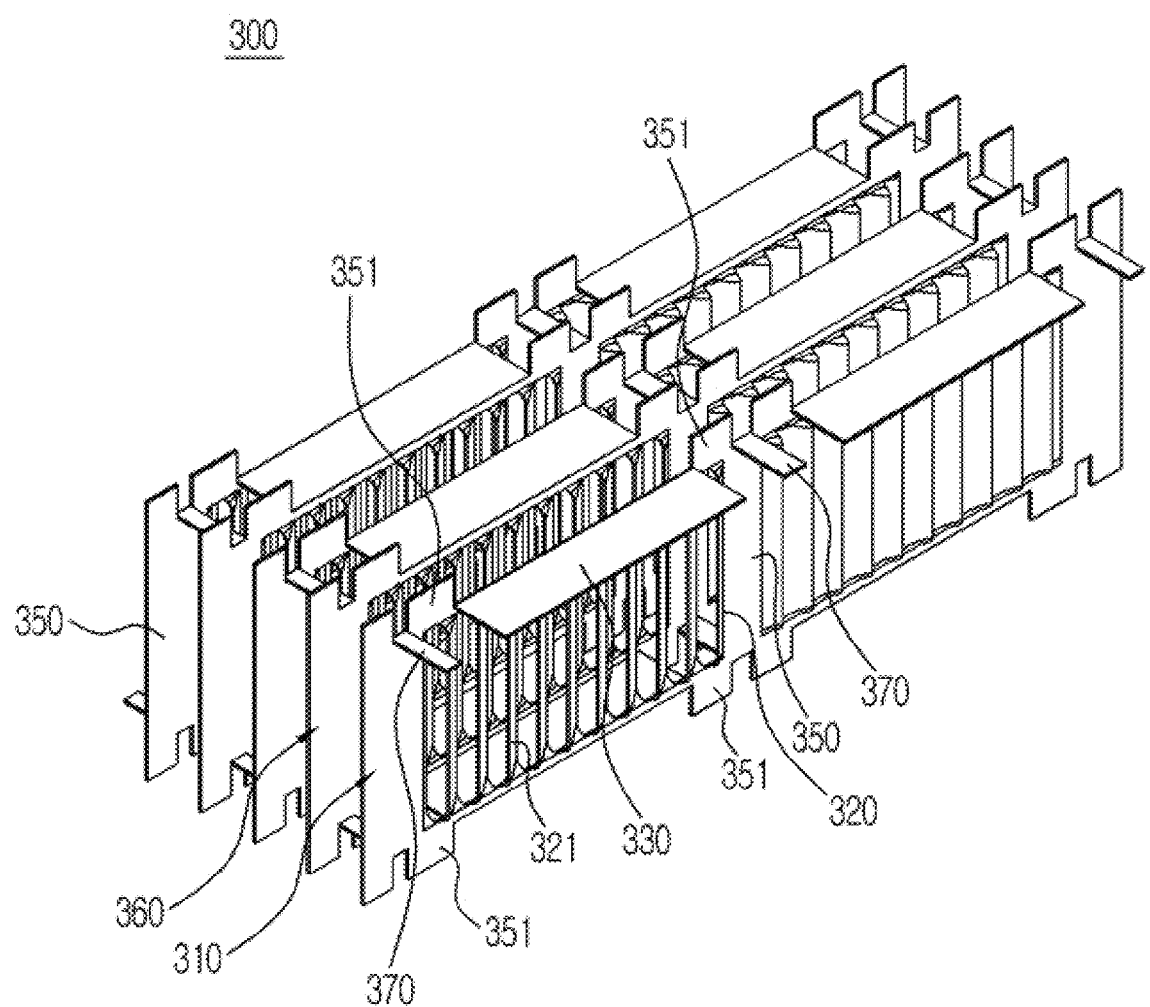
FIG. 13 is a perspective view showing a portion of a corrugated fin according to another embodiment of the present disclosure.
Figure 14:
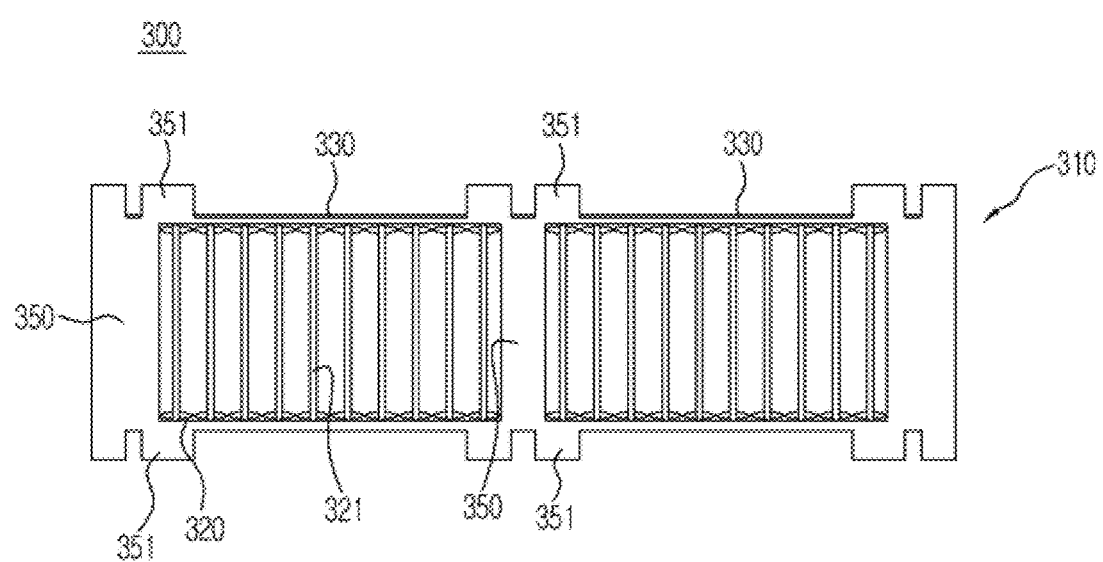
FIG. 14 is a side view showing a portion of the corrugated fin according to the embodiment of the present disclosure.

FIG. 13 is a perspective view showing a portion of a corrugated fin according to another embodiment of the present disclosure and FIG. 14 is a side view showing a portion of the corrugated fin according to the embodiment of the present disclosure.

A corrugated fin according to another embodiment of the present disclosure will be described with reference to FIGS. 13 and 14. The same components as the previous embodiment may be denoted by the same reference numerals and a description thereof may be omitted.

A corrugated fin 300 according to this embodiment includes vertical fin bodies 310 and contact parts 330 provided at the upper and lower ends of the fin bodies 310 in contact with tubes.

Each fin body 310 may be provided with a louver unit 320 having louvers 321 successively formed in the lateral direction to improve heat transfer performance. In addition, each fin body 310 may be provided with drainage guides 350 formed at outsides of the contact part 330 in the lateral direction such that the condensed water easily falls in the direction of gravity. Each drainage guide 350 may include protruding parts 351 protruding upward and downward such that the protruding parts 351 are located more outward than the flat contact part 330 in the vertical direction.

In addition, the corrugated fin 300 further includes first fin bodies 310, second fin bodies 360 adjacent to the respective first fin bodies 310 and horizontal connection parts 370 respectively connected between the first fin bodies 310 and the second fin bodies 360.

Meanwhile, in this embodiment, the contact parts 330 of the corrugated fin 300 may include flat contact parts 330, with which flat tops or flat bottoms of the tubes are in surface contact, without curved contact parts.

That is, this embodiment is achieved by omitting the curved contact parts from the corrugated fin 200 according to the previous embodiment. Of course, this embodiment may be achieved by omitting the curved contact parts from the corrugated fin 100 according to the previous embodiment.

Figure 15:
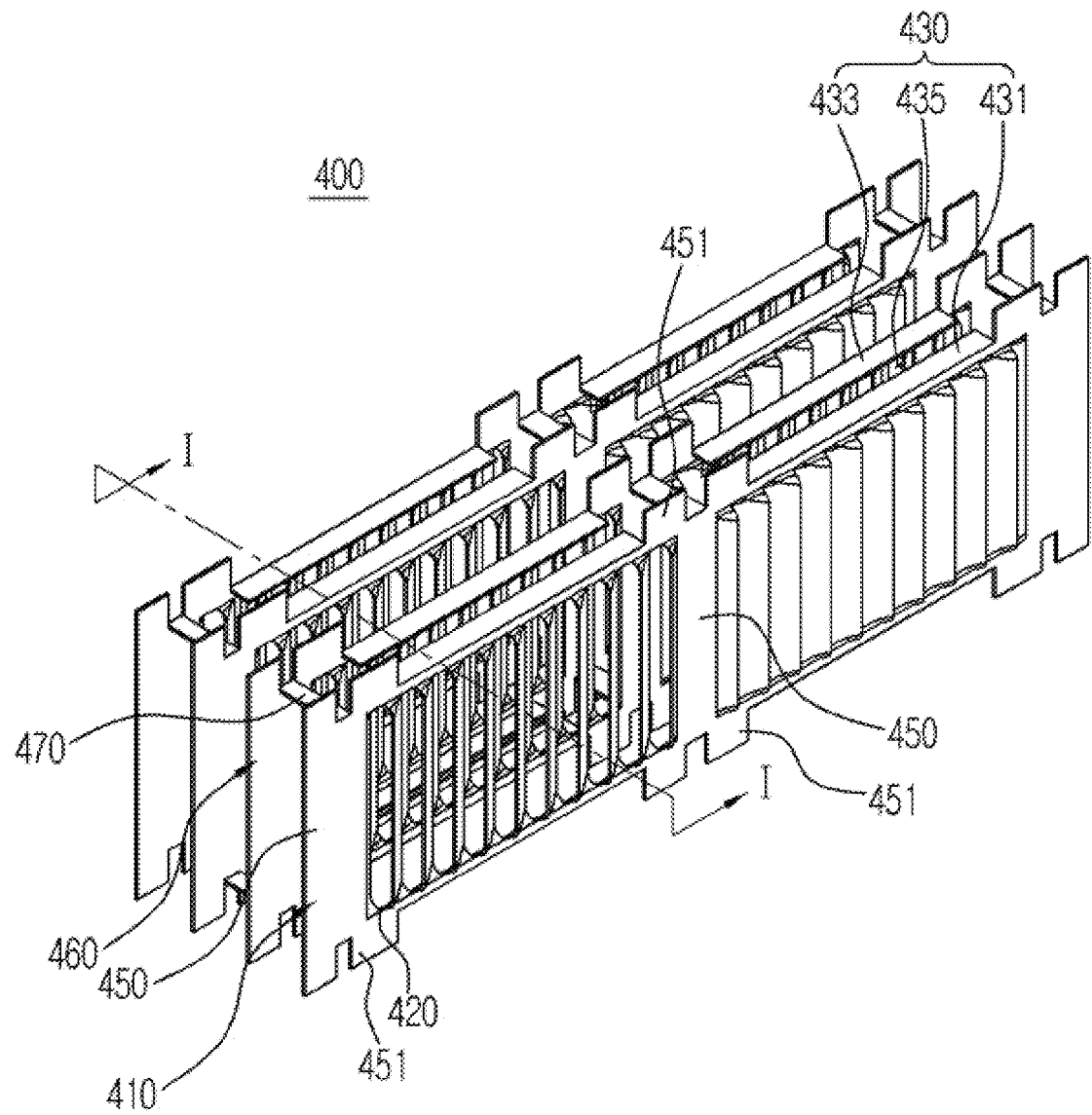
FIG. 15 is a perspective view showing a portion of a corrugated fin according to another embodiment of the present disclosure.
Figure 16:
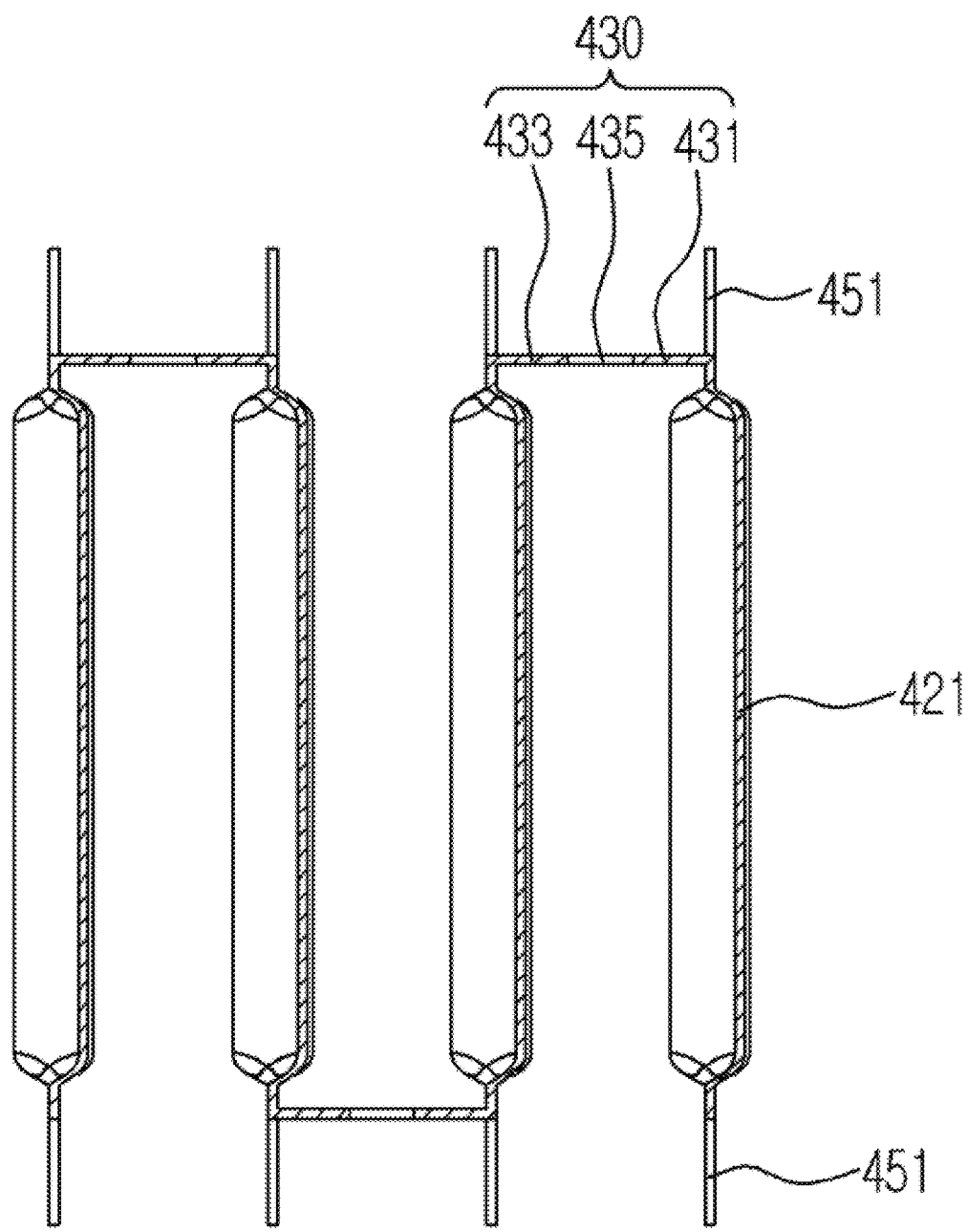
FIG. 16 is a sectional view taken along line I-I of FIG. 15.

FIG. 15 is a perspective view showing a portion of a corrugated fin according to another embodiment of the present disclosure and FIG. 16 is a sectional view taken along line I-I of FIG. 15.

A corrugated fin 400 according to this embodiment includes vertical fin bodies 410 and flat contact parts 430 provided at the upper and lower ends of the fin bodies 410 in contact with tubes.

Each fin body 410 may be provided with a louver unit 420 having louvers 421 successively formed in the lateral direction to improve heat transfer performance. In addition, each fin body 410 may be provided with drainage guides 450 formed at outsides of the flat contact part 430 in the lateral direction such that the condensed water easily falls in the direction of gravity. Each drainage guide 450 may include protruding parts 451 protruding upward and downward such that the protruding parts 451 are located more outward than the flat contact part 430 in the vertical direction.

In addition, the corrugated fin 400 further includes first fin bodies 410, second fin bodies 460 adjacent to the respective first fin bodies 410 and horizontal connection parts 470 respectively connected between the first fin bodies 410 and the second fin bodies 460.

Meanwhile, in this embodiment, each flat contact part 430 of the corrugated fin 400 may include a flat first part 431 and a flat second part 433, with which flat tops or flat bottoms of the tubes are in surface contact, and an opening 435 defined between the first part 431 and the second part 433.

That is, this embodiment is achieved by adding the opening 435 to each flat contact part of the corrugated fin 300 according to the previous embodiment.

Figure 17:
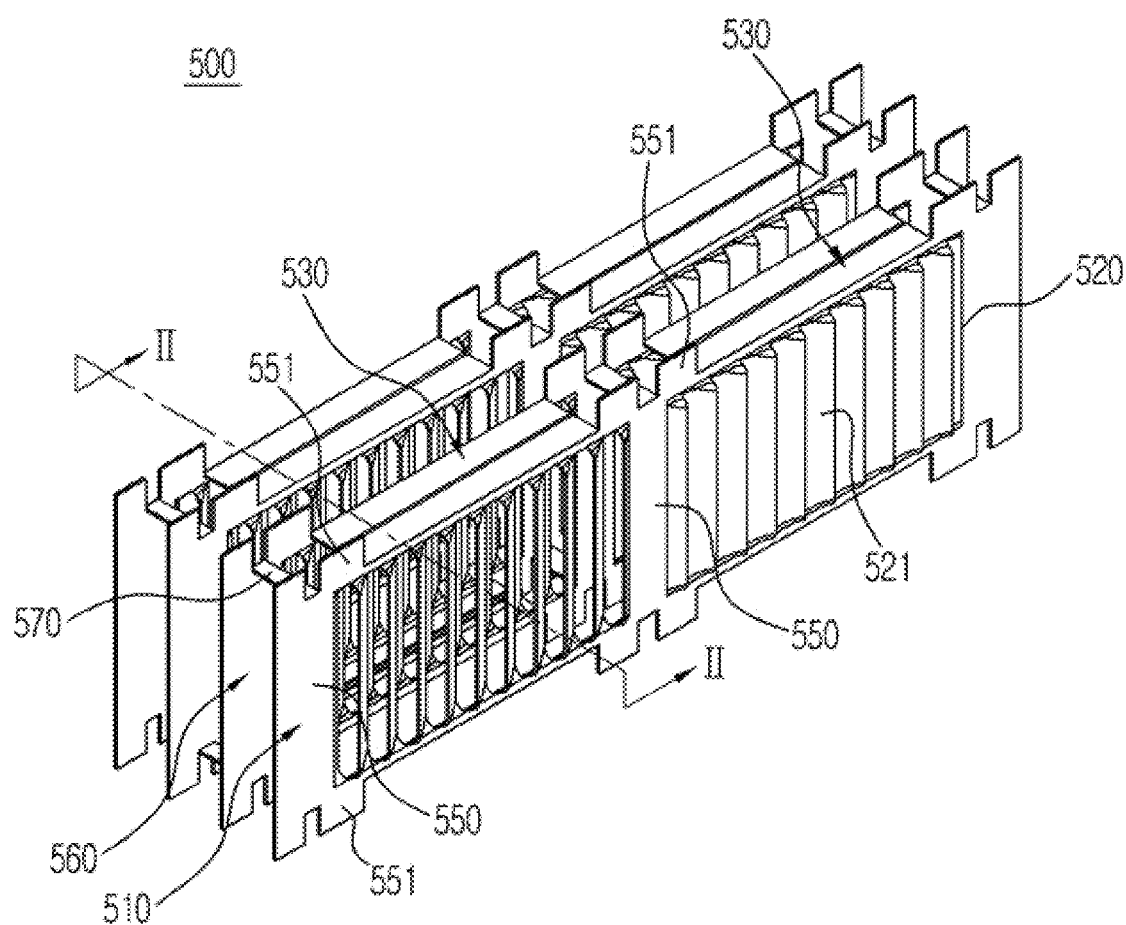
FIG. 17 is a perspective view showing a portion of a corrugated fin according to another embodiment of the present disclosure.
Figure 18:
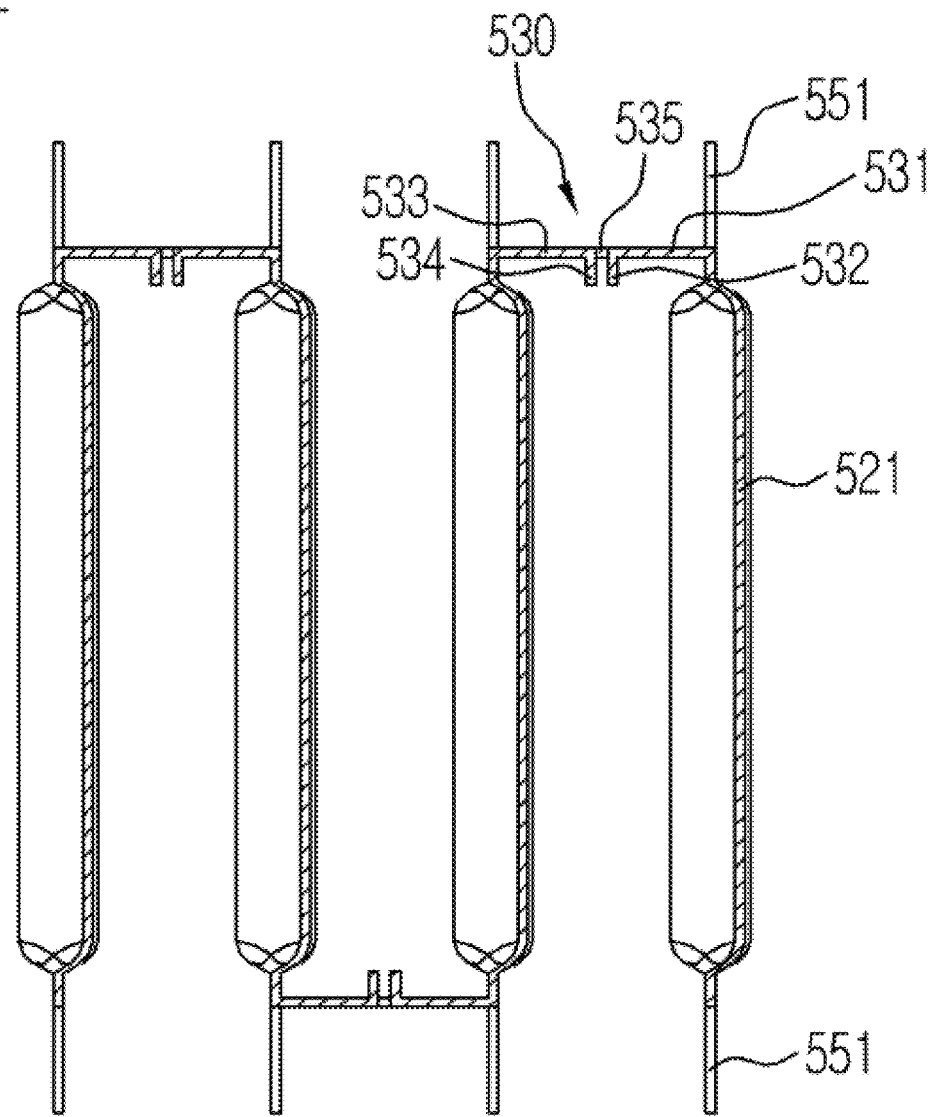
FIG. 18 is a sectional view taken along line II-II of FIG. 17.

FIG. 17 is a perspective view showing a portion of a corrugated fin according to another embodiment of the present disclosure and FIG. 18 is a sectional view taken along line II-II of FIG. 17.

A corrugated fin 500 according to this embodiment includes vertical fin bodies 510 and flat contact parts 530 provided at the upper and lower ends of the fin bodies 510 in contact with tubes.

Each fin body 510 may be provided with a louver unit 520 having louvers 521 successively formed in the lateral direction to improve heat transfer performance. In addition, each fin body 510 may be provided with drainage guides 550 formed at outsides of the flat contact part 530 in the lateral direction such that the condensed water easily falls in the direction of gravity. Each drainage guide 550 may include protruding parts 551 protruding upward and downward such that the protruding parts 551 are located more outward than the flat contact part 530 in the vertical direction.

In addition, the corrugated fin 500 further includes first fin bodies 510, second fin bodies 560 adjacent to the respective first fin bodies 510 and horizontal connection parts 570 respectively connected between the first fin bodies 510 and the second fin bodies 560.

Meanwhile, in this embodiment, each flat contact part 530 of the corrugated fin 500 may include a flat first part 531 and a flat second part 533, with which flat tops or flat bottoms of the tubes are in surface contact, an opening 535 defined between the first part 531 and the second part 533, a bent part 532 bent perpendicularly downward from one end of the first part 531, and a bent part 534 bent perpendicularly downward from one end of the second part 533.

Figure 19:
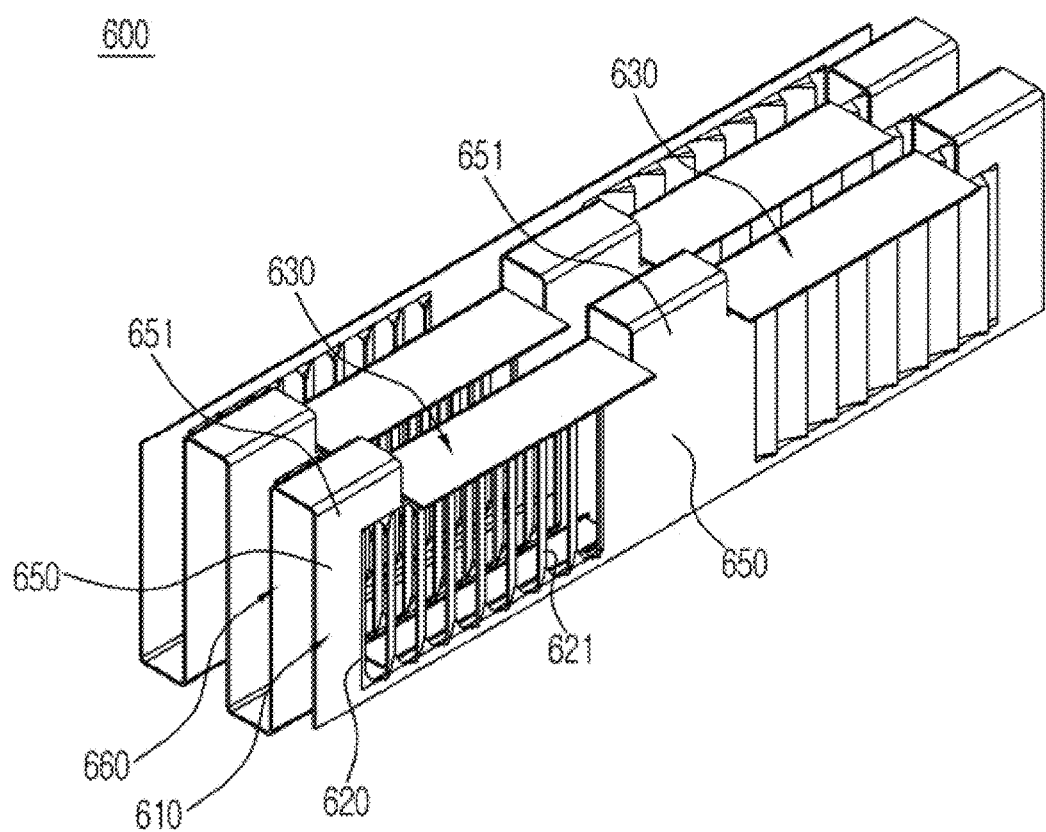
FIG. 19 is a perspective view showing a portion of a corrugated fin according to another embodiment of the present disclosure.
Figure 20:
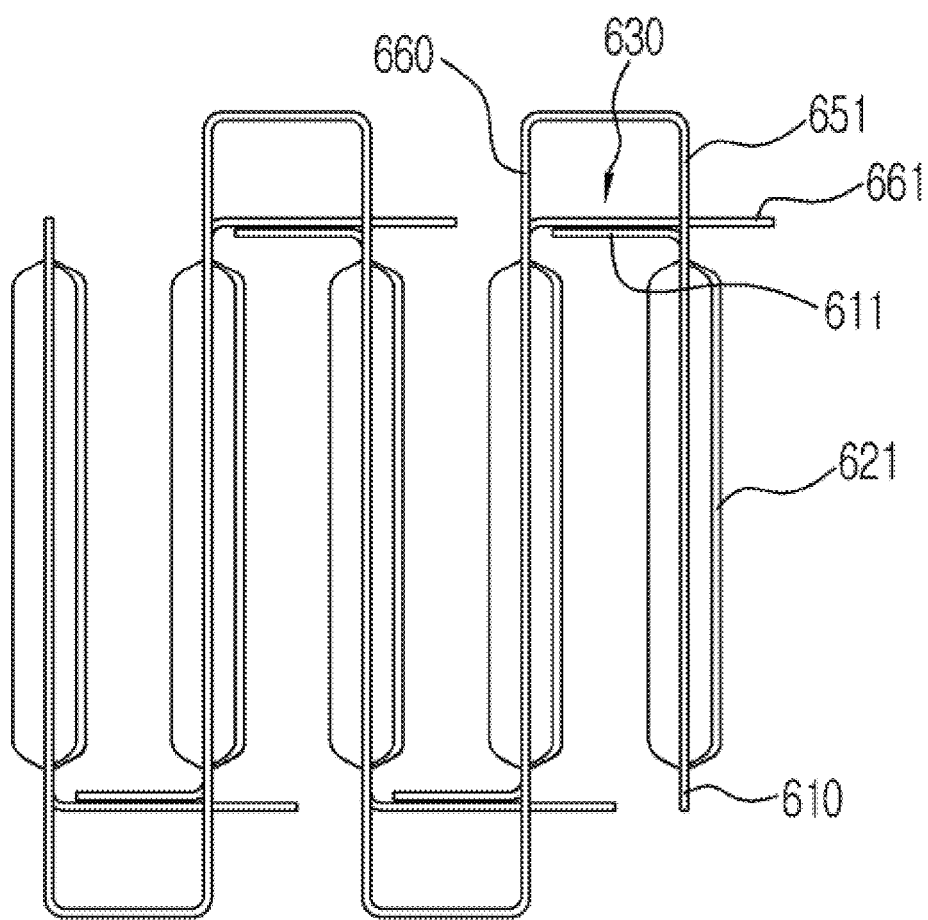
FIG. 20 is a side view showing a portion of the corrugated fin according to the embodiment of the present disclosure.

FIG. 19 is a perspective view showing a portion of a corrugated fin according to another embodiment of the present disclosure and FIG. 20 is a side view showing a portion of the corrugated fin according to the embodiment of the present disclosure.

A corrugated fin 600 according to this embodiment includes vertical fin bodies 610 and flat contact parts 630 provided at the upper and lower ends of the fin bodies 610 in contact with tubes.

Each fin body 610 may be provided with a louver unit 620 having louvers 621 successively formed in the lateral direction to improve heat transfer performance. In addition, each fin body 610 may be provided with drainage guides 650 formed at outsides of the flat contact part 630 in the lateral direction such that the condensed water easily falls in the direction of gravity. Each drainage guide 650 may include protruding parts 651 protruding upward and downward such that the protruding parts 651 are located more outward than the flat contact part 630 in the vertical direction.

Meanwhile, in this embodiment, the corrugated fin 600 further includes first fin bodies 610 and second fin bodies 660 adjacent to the respective first fin bodies 610. Each flat contact part 630 may include a first bent part 611 bent from a corresponding first fin body 610 toward a corresponding second fin body 660 and a second bent part 661 bent from the second fin body 660 toward the first fin body 610, the first bent part 611 and the second bent part 661 overlapping each other.

Figure 21:
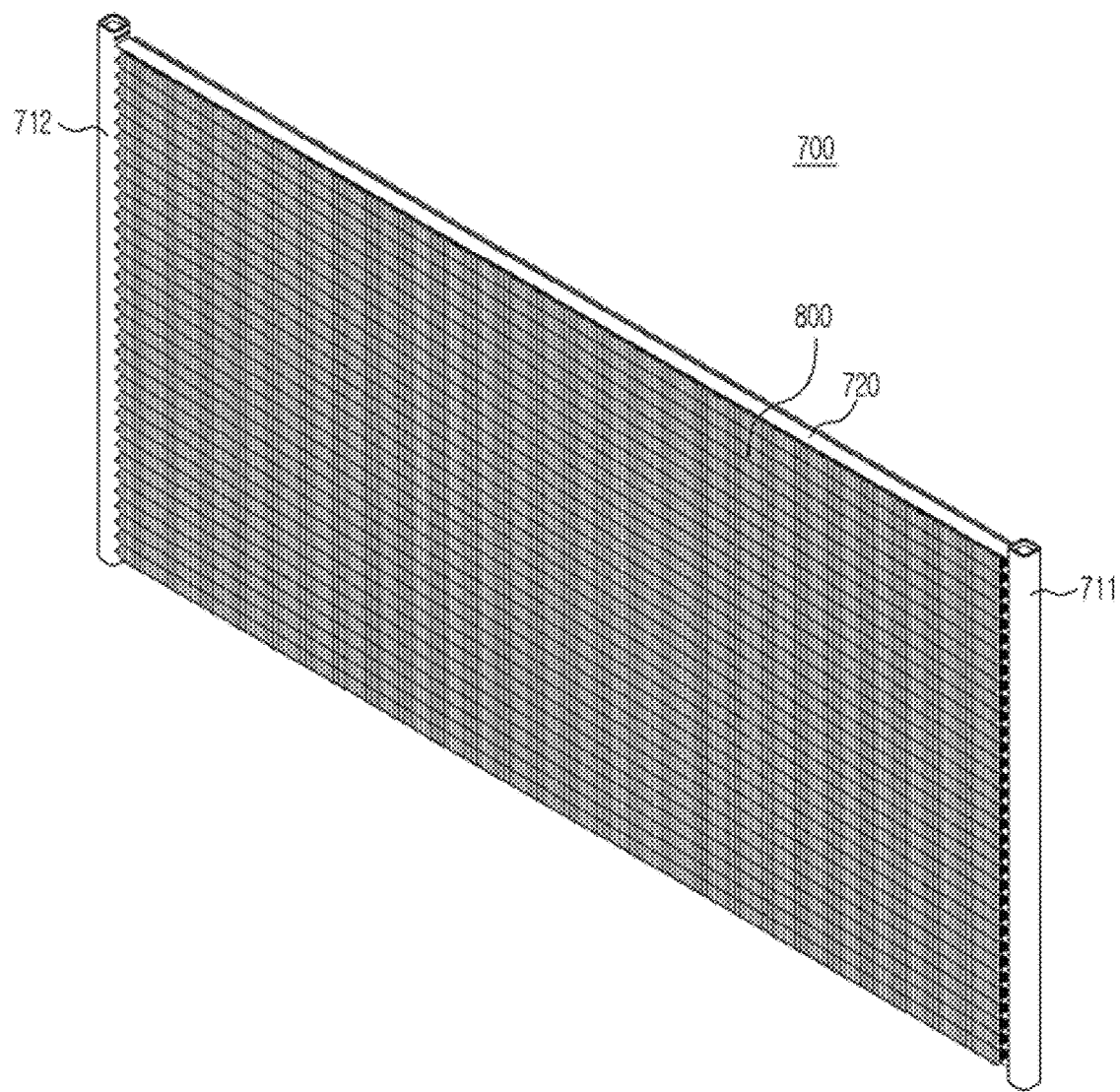
FIG. 21 is a view showing the external appearance of a heat exchanger according to another embodiment of the present disclosure.
Figure 22:
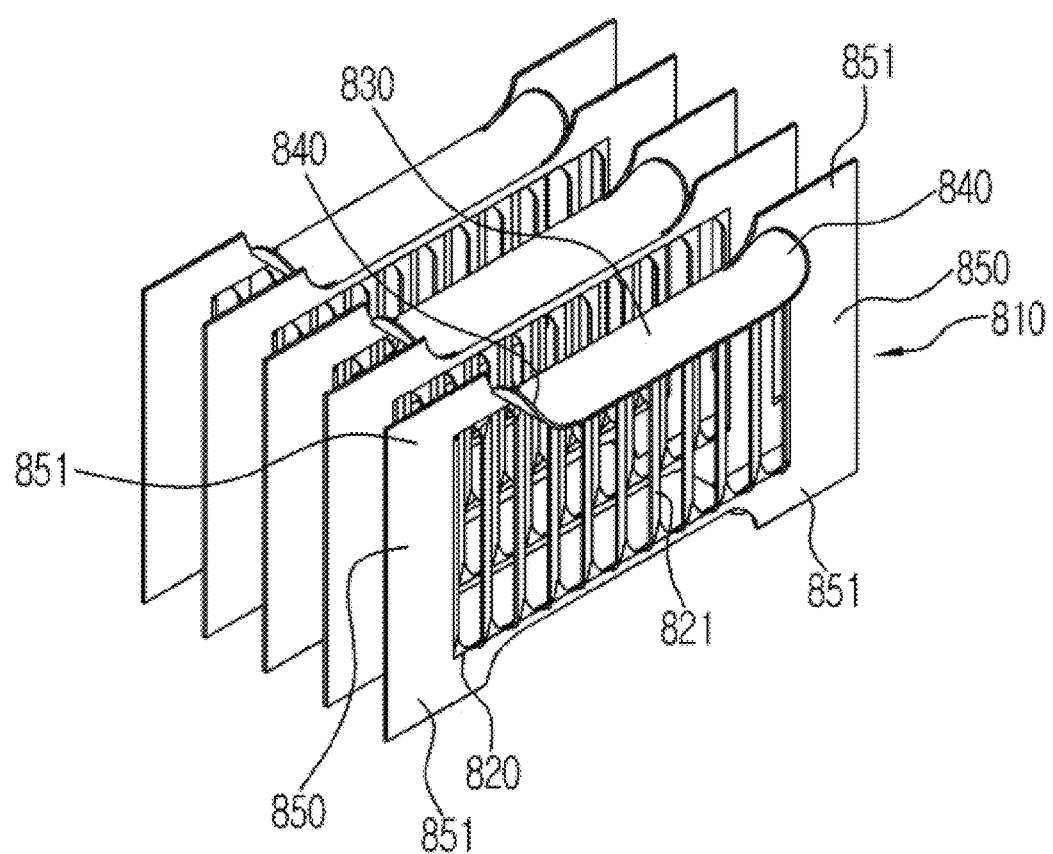
FIG. 22 is a perspective view showing a portion of a corrugated fin according to a further embodiment of the present disclosure.

FIG. 21 is a view showing the external appearance of a heat exchanger according to another embodiment of the present disclosure and FIG. 22 is a perspective view showing a portion of a corrugated fin according to a further embodiment of the present disclosure.

As previously described, embodiments of the present disclosure are not limited to a heat exchanger having two-row tubes. Embodiments of the present disclosure may also be applied to a heat exchanger having one-row tubes or three-row tubes or more.

For example, as shown in FIG. 21, a heat exchanger 700 may include one-row tubes 720, headers 711 and 712 vertically provided at opposite ends of the tubes 720 to support the tubes 720 and to enable the refrigerant to flow in the tubes 720, and corrugated fins 800 disposed between the tubes 720 in contact, the corrugated fins 800 being corrugated in a wave form.

Each corrugated fin 800 includes vertical fin bodies 810 and contact parts 830 and 840 provided at the upper and lower ends of the fin bodies 810 in contact with the tubes 720. The contact parts 830 and 840 may include flat contact parts 830, with which flat tops or flat bottoms of the tubes are in surface contact, and curved contact parts 840, extending from opposite ends of the flat contact parts 830, with which round sides of the tubes are in surface contact.

Each fin body 810 may be provided with a louver unit 820 having louvers 821 successively formed in the lateral direction to improve heat transfer performance. In addition, each fin body 810 may be provided with drainage guides 850 formed at outsides of the flat contact part 830 in the lateral direction such that the condensed water easily falls in the direction of gravity. Each drainage guide 850 may include protruding parts 851 protruding upward and downward such that the protruding parts 851 are located more outward than the flat contact part 830 in the vertical direction.

As is apparent from the above description, a parallel flow type heat exchanger having vertical headers and corrugated fins according to embodiments of the present disclosure has effects in that drainage performance is excellent and formation of frost is delayed and, therefore, heat exchange efficiency is not lowered even when the heat exchanger is used as an evaporator.

Specifically, drainage guides of each corrugated fin protrude vertically from opposite sides of tubes such that the condensed water easily falls in the direction of gravity. In addition, flat contact parts and curved contact parts are provided to surround the tubes to minimize direct contact between the surfaces of the tubes and external wet air, to accelerate heat transfer between the tubes and the corrugated fins, and to delay formation of frost.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A heat exchanger comprising:
   tubes horizontally arranged so as to be vertically spaced from each other by a predetermined distance, each tube having a flat top, a flat bottom, and round sides;
   headers vertically disposed at opposite ends of the tubes such that the headers communicate with the tubes; and
   corrugated fins disposed between the tubes and in contact with the tubes, wherein the corrugated fins comprise:
      a vertical fin body;
      flat contact parts formed at an upper part and a lower part of the fin body, the flat contact parts being in surface contact with a top and a bottom of the tubes; and
      curved contact parts extending from opposite ends of the flat contact parts, the curved contact parts being in surface contact with the sides of the tubes,
   wherein
   the fin body comprises drainage guides formed outside the flat contact parts in a lateral direction,
   each drainage guide comprises protruding parts protruding more upward and downward than the flat contact parts, and
   the curved contact parts are disconnected from the protruding parts.

2. The heat exchanger according to claim 1, wherein each flat contact part has the same width as the top or the bottom of each tube.

3. The heat exchanger according to claim 1, wherein each curved contact part has the same curvature as the sides of each tube.

4. The heat exchanger according to claim 1, wherein each protruding part has a height equal to or less than half a height of each tube.

5. The heat exchanger according to claim 1, wherein each protruding part has a height of 0.65 to 1.5 mm.

6. The heat exchanger according to claim 1, wherein each drainage guide has a width of 3 to 5 mm.

7. The heat exchanger according to claim 1, wherein the corrugated fins further comprise a louver unit having a plurality of successively formed louvers, and
   at least a portion of the louver unit is formed at each drainage guide.

8. The heat exchanger according to claim 1, wherein the corrugated fins comprise a first corrugated fin disposed above any one of the tubes and a second corrugated fin disposed below the tube, and
   the first corrugated fin and the second corrugated fin are disposed such that a lower protruding part of the first corrugated fin and an upper protruding part of the second corrugated fin contact each other.

9. The heat exchanger according to claim 1, wherein the tubes are arranged in two rows comprising a front row and a rear row,
   the flat contact parts are arranged in two rows comprising a front row and a rear row,
   the curved contact parts are arranged in two rows comprising a front row and a rear row, and
   the drainage guides comprise outside drainage guides formed at a front outside of the front-row flat contact part and a rear outside of the rear-row flat contact part and an inside drainage guide formed between the front-row flat contact part and the rear-row flat contact part.

10. The heat exchanger according to claim 1, wherein the protruding parts are formed by cutting a top and a bottom of an intermediate molding for the corrugated fin having a square wave form along a predetermined cutting line and bending predetermined portions.

11. The heat exchanger according to claim 1, wherein the curved contact parts are formed by cutting a top and a bottom of an intermediate molding for the corrugated fins having a square wave form along a predetermined cutting line and bending predetermined portions.

12. The heat exchanger according to claim 1, wherein the fin body comprises a first fin body and a second fin body extending from a front end and a rear end of each flat contact part, and
   the corrugated fins further comprise a connection part connected between the first fin body and the second fin body.

13. A corrugated fin of a heat exchanger having tubes horizontally arranged so as to be vertically spaced from each other by a predetermined distance, each tube having a flat top, a flat bottom, and round sides, the corrugated fin comprising:
   a vertical fin body;
   flat contact parts formed at an upper part and a lower part of the fin body, the flat contact parts being in surface contact with a top and a bottom of the tubes; and
   curved contact parts extending from opposite ends of the flat contact parts, the curved contact parts being in surface contact with the sides of the tubes,
   wherein the fin body comprises drainage guides formed outside the flat contact parts in a lateral direction, each drainage guide comprises protruding parts protruding more upward and downward than the flat contact parts, and the curved contact parts are disconnected from the protruding parts.

* * * * *